(No Model.)
A. G. MACK.
FISH HOOK.
No. 479,194. Patented July 19, 1892.
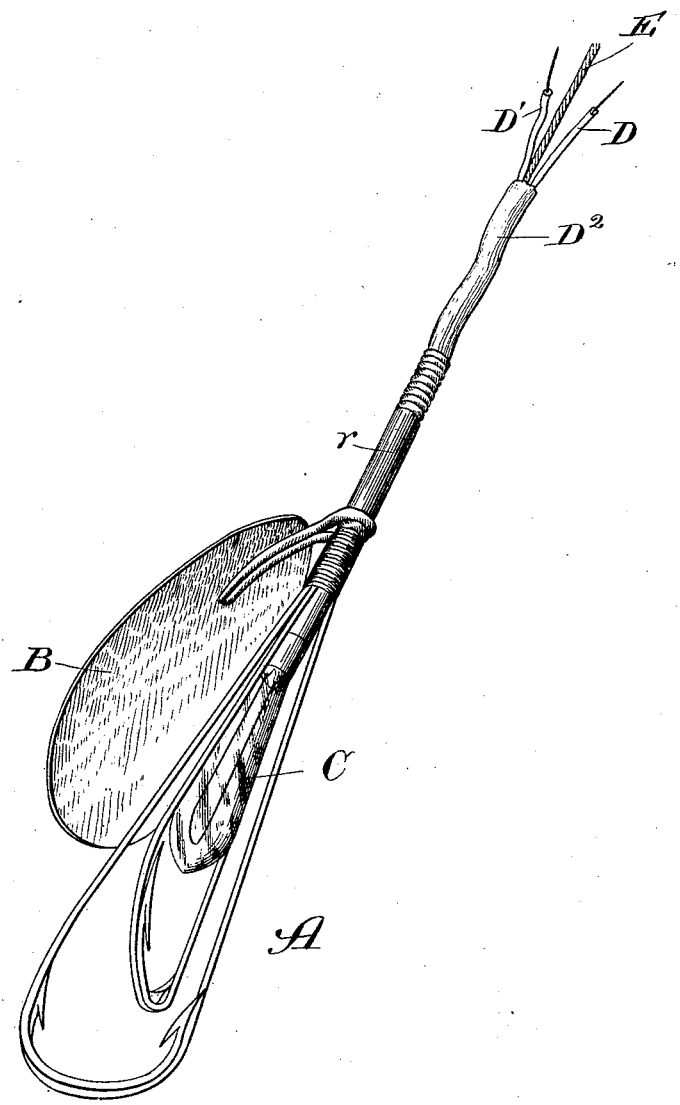
Witnesses:
Chas. E. Gaylord,
J. P. Dyrenforth.
Inventor:
Albert G. Mack,
By Dyrenforth & Dyrenforth,
Attys.

UNITED STATES PATENT OFFICE.

ALBERT G. MACK, OF ROCHESTER, NEW YORK, ASSIGNOR OF ONE-HALF TO CHARLES E. FELTON, OF CHICAGO, ILLINOIS.

FISK-HOOK.

SPECIFICATION forming part of Letters Patent No. 479,194, dated July 19, 1892.

Application filed February 18, 1891. Serial No. 381,835. (No model.)

*To all whom it may concern:*

Be it known that I, ALBERT G. MACK, a citizen of the United States, residing at Rochester, in the county of Monroe and State of New York, have invented a new and useful Improvement in Fish-Hooks, of which the following is a specification.

The object of my invention is to provide, as a means of attracting fish to a hook, an electric illumination at the hook as the fishing-bait.

In the accompanying drawing I represent, by a perspective view, my improvement in the form of a group of fish-hooks enveloping an incandescent electric light, the conductors leading to it, and the fishing line and a spoon for trolling.

A is a group of fish-hooks arranged relatively to overlap each other in a manner mutually to protect the points as set forth in my application for Letters Patent, Serial No. 331,832, filed February 18, 1891. The fish-hooks A are fastened near the upper ends of their shanks to a section or tube $r$, on which the spoon B may, if used, be hung.

C is an incandescent electric lamp of any suitable or well-known construction, the form of which may be according to desire. Thus one suitable form that may be suggested as particularly desirable would be that of a minnow. The lamp C involves, of course, the necessary or usual details of construction of such article—namely, a transparent vacuum-bulb containing the filament on conducting-wires.

D and D' are the conductors, which should be separately insulated, and which I inclose together in a desired comparatively short length of flexible tube $D^2$, of insulating material, such as rubber, through which, also, the fishing-line E is passed and secured to the hooks in any suitable manner, preferably at the tube $r$. The conductors D D' are of course electrically connected with the lamp and lead from or are adapted to be connected with the generator (not shown) which may occupy during the fishing any convenient position, as under cover in a boat, the conductors being sufficiently long to avoid interference with the throwing of the line E. By fastening the line E to the tube $r$ there will be no strain on the lamp in case of a catch.

When the fish-hook is provided in a group thereof, as shown, the group affords the advantage of protecting the lamp, which it serves to envelop, against fracture; but I do not limit my improvement to a group of hooks, since it is applicable with a single hook or with any number thereof arranged in any desired manner. If desired, the lamp may be shielded for protection by any suitable means.

What I claim as new, and desire to secure by Letters Patent, is—

1. In combination, a fish-hook or series thereof, an incandescent lamp, and a shield therefor, all arranged in juxtaposition as an artificial bait, substantially as described.

2. In combination, a group of fish-hooks and an incandescent electric lamp supported to extend inside and be shielded by the said group and insulated conductors extending from the lamp for connection with a suitable generator, substantially as described.

3. In combination, a fish-hook having secured to it a tube $r$, an incandescent electric lamp connected with the hook and having insulated conductors passing through the tube for connection with a suitable generator, and a fish-line fastened to the hook, substantially as and for the purpose set forth.

4. In combination, a fish-hook having secured to it a tube $r$, an incandescent electric lamp connected with the hook and having insulated conductors passing through the tube for connection with a suitable generator, a fish-line fastened to the hook, and a flexible tube $D^2$, of insulating material, fastened to the tube $r$ and enveloping the fish-line and conductors, substantially as and for the purpose set forth.

ALBERT G. MACK.

In presence of—
LESTER G. FISHER,
VICTOR KNAPP.